Figure 1:
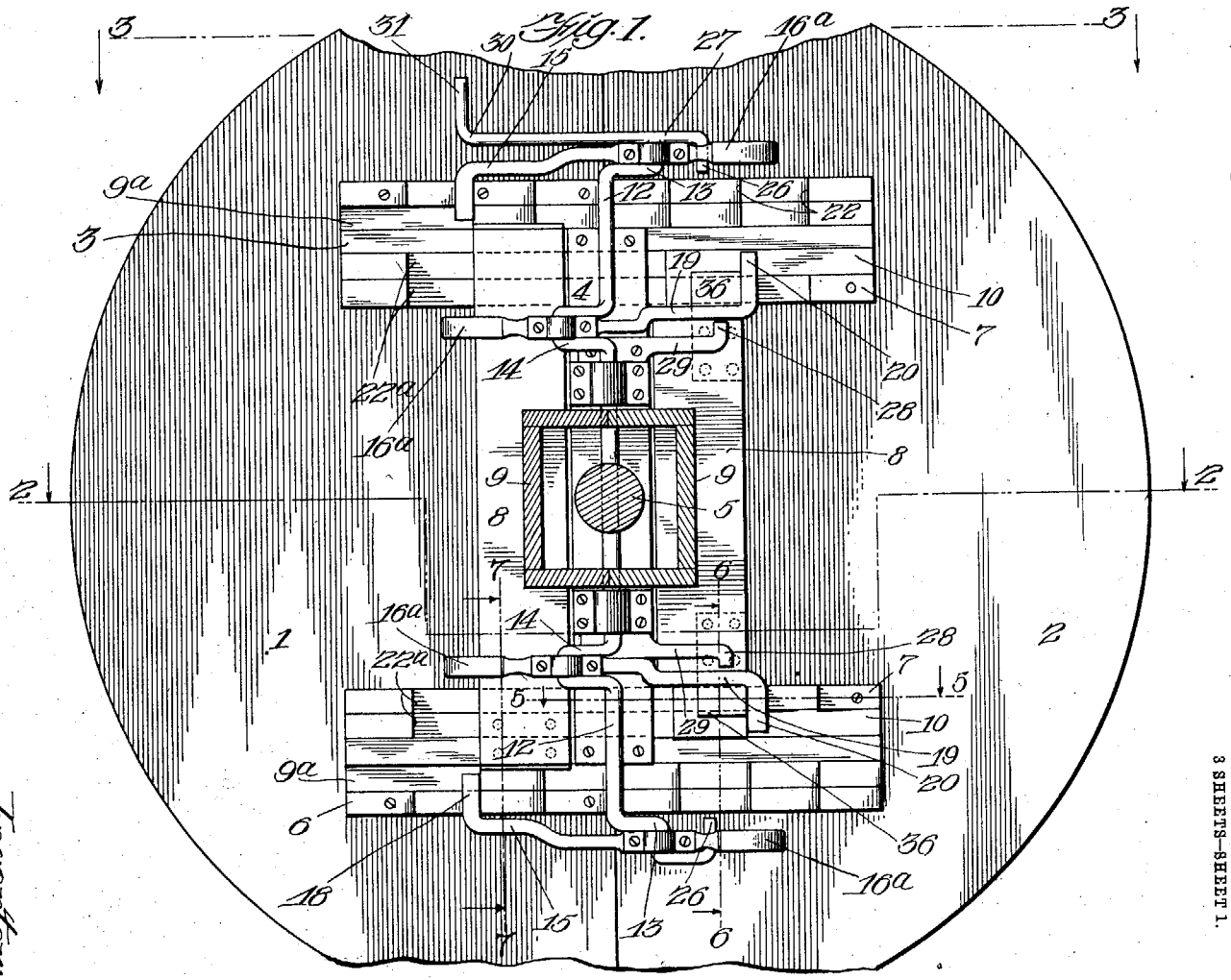

C. S. BURTON.

EXTENSION TABLE LOCK.

APPLICATION FILED OCT. 1, 1909.

Reissued Apr. 22, 1913.

13,555.

3 SHEETS—SHEET 1.

Witnesses:
P. J. Gathmann
C. J. Chrishoffel

Inventor:
Chas. S. Burton
By his Attorneys:
Burton & Burton

COLUMBIA PLANOGRAPH CO., WASHINGTON, D. C.

C. S. BURTON.
EXTENSION TABLE LOCK.
APPLICATION FILED OCT. 1, 1909.
Reissued Apr. 22, 1913.
13,555.
3 SHEETS—SHEET 2.
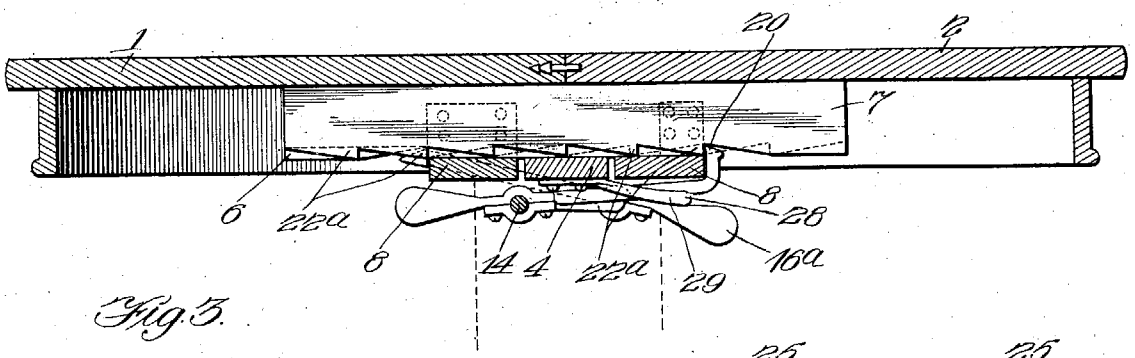
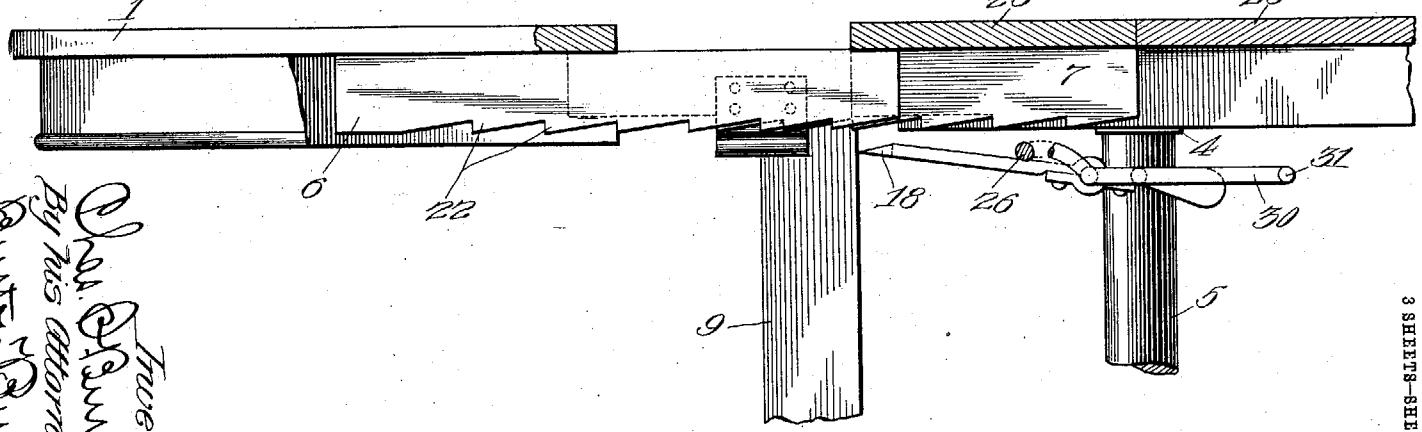
Witnesses:
P. J. Gathmann.
C. J. Christoffel
Inventor:
Chas. S. Burton
By his Attorneys:
Burton & Burton
COLUMBIA PLANOGRAPH CO., WASHINGTON, D. C.

C. S. BURTON.
EXTENSION TABLE LOCK.
APPLICATION FILED OCT. 1, 1909.
Reissued Apr. 22, 1913.
13,555.
3 SHEETS—SHEET 3.
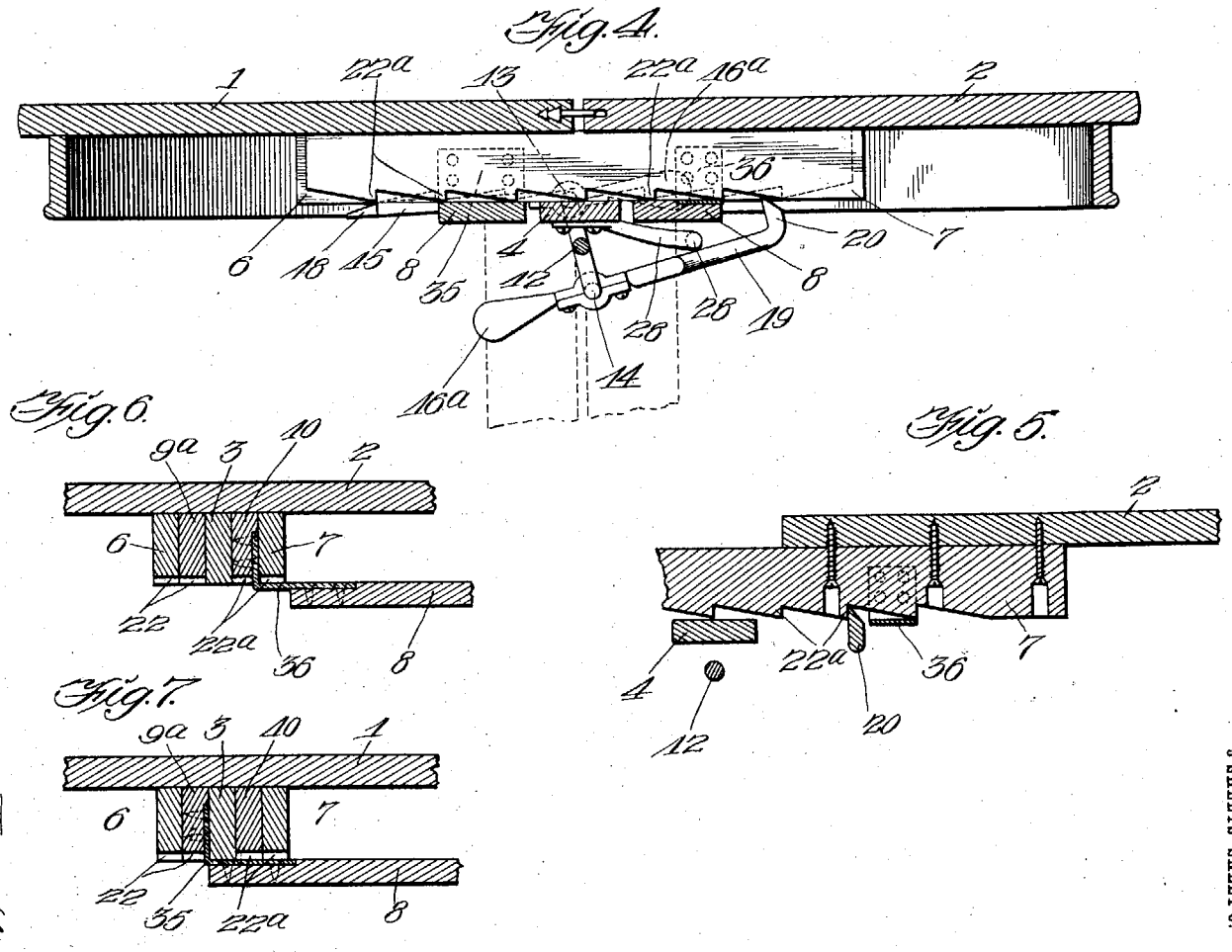
Witnesses:
P. J. Gathmann
C. J. Christoffel
Inventor:
Chas. S. Burton
By his Attorneys:
Burton & Burton
COLUMBIA PLANOGRAPH CO., WASHINGTON, D. C.

UNITED STATES PATENT OFFICE.

CHARLES S. BURTON, OF OAK PARK, ILLINOIS, ASSIGNOR TO EMIL TYDEN, OF HASTINGS, MICHIGAN.

EXTENSION-TABLE LOCK.

13,555. Specification of Reissued Letters Patent. Reissued Apr. 22, 1913.

Original No. 901,951, dated October 27, 1908, Serial No. 378,090. Application for reissue filed October 1, 1909. Serial No. 520,599.

*To all whom it may concern:*

Be it known that I, CHARLES S. BURTON, a citizen of the United States, residing at Oak Park, in the county of Cook and State of Illinois, have invented new and useful Improvements in Extension-Table Locks, of which the following is a specification, reference being had to the drawings forming a part thereof.

The purpose of this invention is to provide an improved device for locking together the parts of an extension table, especially adapted for so locking the table, not only when fully closed but at any point to which it may be extended, with interposed leaves or fillers.

It consists in the features of construction shown and described and set out in the claims.

In the drawings:—Figure 1 is an inverted partly sectional plan view of a table embodying this invention, section being made at a horizontal plane through the pedestal. Fig. 2 is a section at the line 2—2 on Fig. 1. Fig. 3 is a partly sectional side elevation with the top and skirt or marginal molding partly cut away. Fig. 4 is a view similar to Fig. 2, showing the operating pawls in disengaged position. Fig. 5 is a section at the line 5—5 on Fig. 1, with the pawl in a different position. Fig. 6 is a detail section at the line 6—6 on Fig. 1. Fig. 7 is a section at the line 7—7 on Fig. 1.

I have shown this invention applied to a pedestal extension table because this form of table presents some difficulties which are not present in the ordinary form of five-legged table, but it is to be understood that the invention is applicable to any extension table employing the customary extension slides.

The two table members, 1 and 2, are represented as connected by customary slides, which are shown in sufficient number to indicate the manner of using the invention with any number. It will be understood that the minimum number of slides in each of the two sets of slides in any extension table is three, the middle slides, 3, 3, of each set being connected by a bridge, 4, which carries the center leg, 5. The outermost slides, 6, 6, of the two sets are made rigid with one member of the table top,—in this case with the member, 1,—while the innermost slides, 7, 7, are similarly rigid with the other table member, 2. The corresponding intervening slides in the two sets may be unconnected with any parts, except for their sliding connections with the adjacent slides, and when this is the case the application of my invention presents the least difficulties, but in case of a pedestal table, the pedestal caps, 8, 8, of the two pedestal members, 9, 9, constitute bridges for attaching the pedestal members respectively to the table members. Such attachment in the more common type of pedestal table is direct,—that is, so as to make the pedestal member rigid with the corresponding table member,—the bridges, 8, 8, being made rigid, one with the outermost slides 6, 6, and the other with the innermost slides, 7, 7, which are rigid with the two table members respectively. For certain construction in which it is desired to render the table top extensible to a certain extent without extending the pedestal as shown in the drawings of this application, the pedestal caps or bridges, 8, of one pedestal member are connected to the slides, $9^a$, $9^a$, which intervene between the outermost and the middle slides, and the corresponding bridge of the other pedestal member is connected to the slides, 10, 10, which intervene between the innermost and the middle slides. When any larger number of slides is employed they will usually intervene between the middle slide and the next slide on either side. To enable the operating pawl fingers, 18, hereinafter described, to reach the edges of the slides, $9^a$, and the pawl fingers, 20, hereinafter described, to reach the edges of the slides, 7 and 10, the attachment of the bridges, 8, 8, to the slides, $9^a$ and 10, respectively, is made by angle plates, 35 and 36, the plate 35, being let into the upper surface of the longer bridge, 8, and into the inner side of the slide, $9^a$, leaving nearly the entire thickness of that slide exposed at the edge for engagement with the pawl, as hereinafter described, the plate, 36, being similarly let into and secured to the under side of the shorter bridge, 8, and extended beyond the end of said shorter bridge under the lower edge of the slide, 7, and let into and secured to the inner surface of the slide, 10, as seen in Fig. 6.

On the under side of the bridge, 4, which carries the center leg there is mounted a rock shaft, 12, which, when thus mounted, extends through the center leg or past its upper end at its junction with the bridge, 4. At each end of the rock shaft which extends past the lower edge of the outermost slides it is provided with a crank arm, 13, both cranks extending toward the right hand for operating the locking devices of the right-hand member of the table, and on the rock shaft inside of the innermost slides respectively there are provided two similar crank arms, 14, 14, extending in the opposite direction for operating the locking devices for the left-hand table member. To each of the crank arms, 13, 13, there are pivotally connected pawls, 15, 15, provided with means,—as, for example, counterweights, 16[a], operating to uphold the pawls toward the plane of the table. Each pawl has at its end remote from the crank an inwardly jutting stud or finger, 18, which extends across the lower edges of all the slides outside the middle slide. To the crank arms, 14, there are connected similar pawls, 19, 19, which extend outward from the cranks alongside the innermost slides and have outwardly jutting fingers, 20, 20, extending across below the lower edges of all the slides located inward from the middle slides. The lower edges of the slides outside the middle slides are provided with ratchet teeth 22, 22, having their abrupt shoulders facing toward the outer end of the table member to which the slides pertain in position to be engaged by the studs, or fingers, 18, of the pawls, 15, for resisting the outward or extending movement of the slides, and for drawing the slides inward when the links are pulled inward. The notches in the several slides are separated by intervals equal to half the unit filler width, the fillers, 25, being all of the same width, and in the drawings they may be understood as about nine inches in width each, making the distance between ratchet teeth 4½ inches. The inner slides similarly have their lower edges provided with ratchet teeth, 22[a], similarly spaced.

When the table is closed up without extension, the ratchet teeth are in position to be engaged by the fingers, 18 and 20, respectively of the pawls which are operated by the several cranks of the rock shaft, and the shaft being rocked in direction to carry the cranks respectively to the opposite side of the axis of the shaft from that to which the pawls from the respective cranks extend, the pawl fingers are engaged with the ratchet teeth, and if the table members are not tightly closed together the completion of the rocking movement of the shaft to the position at which the crank wrists are alined with the pawl fingers at the opposite side of the rock shaft therefrom will draw the table members tightly together, and the crank wrist having been carried the slightest degree beyond that position, the parts become locked, because any pull on the table members tending to separate them would tend to rock the shaft farther in the direction in which its rocking movement is prevented by the pawls, 19, which at that position are stopped against the bridge, 4.

When it is desired to extend the table, the shaft being rocked in the opposite direction first thrusts the pawls outward, carrying their fingers back from the ratchet teeth of the slides, and a little less than a half revolution of the rock shaft being made in this reverse direction the pawls are thrust out in line with their cranks. The pawls, 15, are stopped against further change of angle with respect to their cranks by studs, 26, which jut off from short extensions, 27, of the cranks and collide with the upper edges of the pawls, respectively at the point of greatest extension or outward thrust thereof, and carry them downward, taking the fingers, 18, out of the path of the ratchet teeth of the slides. For effecting a similar result with respect to the pawls, 19, connected with the cranks, 14, there is provided a trip finger, 28, on a bracket, 29, mounted on the under side of the center leg bridge, and with this trip finger the pawl collides at the same time in the rocking of the shaft that the studs, 26, collide with the pawls, 15, and this collision causes the further movement of the crank by carrying the inner end of the pawls upward, to tip the outer ends downward for disengagement of their fingers, 20, from the notches of the slides.

The rock shaft, 12, has an operating arm, 30, at one end terminating in a crank handle, 31, said arm being conveniently forged into the pawl extension, 27, and appearing as a continuation thereof back past the end of the shaft, as seen in Figs. 1 and 3.

It will be observed, particularly by reference to Figs. 2 and 4 of the drawings, that when the pedestal is closed (Fig. 4 showing it very nearly closed, see dotted-line position of the pedestal halves), the middle slides, by their attachment to the bridge, 4, which connects them, are substantially stopped against endwise movement with respect to the pedestal or supporting member of the table, said bridge, 4, being positioned between the pedestal caps, 8, to which the slides, 9[a] and 10, rigid with the pedestal, are secured, and that the operating rock shaft, 12, mounted on said bridge and fixed with respect to said middle slides, is thereby substantially stopped against movement lengthwise of the table, so that the engagement of the locking devices of the rock shaft with the slides of the two top members, respectively, for locking up the top with intervening fillers when the pedestal is closed, substantially stops the slides of both said top members, and thereby said top members, themselves, and the intervening fillers, against movement longitudinally of the table; that is, prevents the table top from being movable bodily over the supporting member, which it would otherwise be to the extent of any unused extensibility of the top members relatively to the supporting member.

I claim:

1. In an extension table, in combination with the extensible table top members, the sets of slides which connect them for extension consisting each of a middle slide and exterior and interior slides, the extreme exterior and interior slides being connected to the opposite table members and adapted to be withdrawn in opposite directions from the middle slide, the fillers adapted to be inclosed between the table top members when extended, and means carried by the middle slides for disengageably engaging the other slides at intervals corresponding to the width of the fillers.

2. In an extension table, in combination with the separable table members, the sets of slides which connect them for extension consisting each of a middle slide and slides at opposite sides of such middle slide, the extreme slides at each side being connected respectively to the opposite table members and adapted to be withdrawn in opposite directions from the middle slide; a rock shaft carried by the middle slides; pawls operated by the rock shaft, the extreme slides having means for engagement of the pawls therewith for drawing and holding them in direction resisting extension.

3. In an extension table, in combination with the separable table members, two sets of slides connecting them for extension consisting each of a middle slide and slides in each set at opposite sides of the middle slides respectively, the extreme exterior and the extreme interior slides being connected respectively to the opposite table members and adapted to be withdrawn in opposite directions from the middle slides; a bridge bar connecting the middle slides rigidly; a rock shaft mounted on the bridge bar; two sets of pawls operated by the rock shaft engaging respectively the interior and exterior slides, said slides having devices for engagement of the pawls therewith to retract the slides and resist extension thereof.

4. In an extension table, in combination with the separable table members, two sets of slides which connect them for extension, and fillers adapted to be interposed, each set comprising a middle slide and exterior and interior slides at opposite sides of the middle slides, respectively, all said exterior and interior slides being ratcheted, the step intervals between the ratchet shoulders being half the unit filler width, and means carried by the middle slides coöperating with the ratchet shoulders for resisting extension.

5. In an extension table, in combination with the separable table members, the slides which connect them for extension; a rock shaft carried by the middle slides having end cranks outside the outermost slides and intermediate cranks between the two sets of slides, said end and intermediate cranks being extended in opposite directions from the shaft, the slides which are movable with respect to the middle slides for extension being ratcheted on their lower edges; pawls on the end cranks engaging the ratchets of the slides outside the middle slides, and pawls on the intermediate cranks engaging the ratchets of the slides inside the middle slides.

6. In an extension table, in combination with the separable table members, slides for connecting them for extension and fillers adapted to be interposed; a rock shaft carried by the middle slides having extreme cranks outside the outermost slides and intermediate cranks inside the innermost slides of the two groups, all the slides which move relatively to the middle slides for extension having ratcheted edges, the step intervals between the ratchet abutments being substantially half the unit filler width; pawls on the intermediate cranks for engaging the ratcheted edges of the inner slides and on the extreme cranks for engaging the ratcheted edges of the outer slides, the cranks being of such length that their throw within the range of rocking movement of the shaft is sufficient to actuate the pawls the ratchet step distance, the rock shaft having a range of rocking movement for carrying the cranks to locked position at opposite sides of the rock shaft from that at which their pawls are engaged for locking the slides at retracted position.

7. In an extension table which comprises a supporting member and end top members movable relatively thereto for extension to admit fillers, in combination with such supporting member and top members, slides which connect them for extension comprising slides which are fast on the top members respectively, and a device for engagement with a slide on a top member, such slide being provided with means for such engagement positioned along the length of the slide at half filler width intervals, means supported by the supporting member on which said device is mounted and carried independently of the top member.

8. In an extension table which comprises a supporting member and top members movable relatively thereto for extension to admit fillers, in combination with such supporting member and top members, means which connect them for extension comprising slides fast on the top members respectively; a device adapted to be engaged with the supporting member against movement longitudinally thereof, and adapted simultaneously to engage a slide on a top member, such top member slide being provided with a plurality of means for such engagement positioned along the length of the slide at half filler width intervals, means on which said device is mounted and carried independently of the top member, said means being supported by the supporting member.

9. In an extension table which comprises a supporting member and top members which are movable relatively thereto for extension to admit fillers, in combination with such supporting member and top members, means which connect them for extension comprising slides fast on the top members respectively, and other slides fast on the supporting member, and a device for connecting the opposite top member slides adapted to be engaged with the supporting member slides, and simultaneously disengageably engaged with the opposite top member slides; means carried by the supporting member for supporting said device independently of the top member, said top member slides being provided with means for said engagement positioned along the length of the slides at half-filler width intervals.

10. In an extension table which comprises a supporting member and top members movable thereto for extension to admit fillers, in combination with such supporting member and top members, slides which connect them for extension comprising slides carried by the supporting member and other slides which are fast on the opposite top members respectively and are adapted to be withdrawn in opposite directions from the supporting member slides; fillers adapted to be inclosed between the top members when extended; a device for connecting the opposite top member slides adapted to be engaged with the supporting member slides, and simultaneously disengageably engaged with the opposite top member slides at intervals of extension corresponding to the width of the fillers, and means carried by the supporting member for supporting said device independently of the top members.

11. In an extension table which comprises a supporting member and top members movable relatively thereto for extension to admit fillers, in combination with such supporting member and top members, slides which connect them for extension comprising slides carried by the supporting member, and other slides carried by the top members respectively, a rock shaft and pawls operated thereby and extending therefrom in opposite directions and formed for engagement in opposite directions, the slides of the opposite top members having means for the engagement of the oppositely formed pawls, respectively, for drawing said slides and holding them in position resisting extension, and means carried by the supporting member for supporting said rock shaft independently of the top members.

12. In an extension table, comprising a supporting member and top members movable relatively thereto, for extension to admit fillers, in combination with such supporting member and top members, two sets of slides which connect them for extension, each set comprising a slide movable with respect to the top members, the extreme exterior and extreme interior slides being fast respectively on the opposite top members, a rock shaft carried by such movable slide; two sets of pawls operated by the rock shaft engaging respectively the interior and exterior top-member slides, said slides having devices for engagement of the pawls therewith to retract the slides and resist their extension.

13. In an extension table comprising a supporting member and top members movable relatively thereto for extension to admit fillers, in combination with such supporting member and top members, two sets of slides which connect them for extension, and fillers adapted to be interposed, each set comprising interior and exterior slides attached to the top members, respectively, said slides being ratcheted, the step intervals between the ratchet shoulders on each side being half the unit filler width; another slide in each set and means carried by such other slide for engaging said ratchet shoulders in the direction to resist the extension movement of the slides.

14. In an extension table comprising a supporting member and top members movable relatively thereto for extension to admit fillers, two sets of slides which connect the top members with each other and with the supporting member, comprising exterior slides of each group connected to one top member, interior slides of each group connected with the other top member, a rock shaft having cranks outside the outermost slides and intermediate cranks between the two sets of slides, the outside and intermediate cranks being extended respectively in opposite directions from the shaft, said top-member-slides being ratched at the lower edges; pawls on the outside cranks engaging the ratchets of the exterior slides, and pawls on the intermediate cranks engaging the ratchets of the interior slides.

15. In an extension table comprising a supporting member and top members movable relatively thereto for extension to admit fillers, slides which connect said supporting member and top members for extension comprising two groups, the interior slides of each group being connected to one top member, and the exterior slides being connected to the other top member, a rock shaft having cranks outside the outermost slides and intermediate cranks between the interior slides of the two groups, said interior and exterior slides having ratcheted edges, the step intervals between the ratchet abutments being substantially half the unit filler width; pawls on the intermediate cranks for engaging the ratcheted edges of the inner slides and on the outside cranks for engaging the ratcheted edges of the exterior slides, the rocking movement of the shaft being sufficient to actuate the pawls the ratchet step distance, the rock shaft having a range of rocking movement for carrying the cranks to locked position at opposite sides of the rock shaft from that at which their pawls are engaged for locking the slides at retracted position.

16. In an extension table, in combination with a supporting member and top members which are extensible relatively thereto; means which connect the top members with each other and with the supporting member comprising slides fast on the top members, respectively, and other slides movable with respect to the first; a device carried by one of said other slides adapted for engagement with one of the top member slides, the latter being provided with means for such engagement positioned along its length at half-filler-width intervals.

17. In an extension table which comprises a supporting member and top members movable relatively thereto for extension to admit fillers, in combination with such supporting member and top members, means which connect them for extension, comprising slides fast on the top members respectively, and other slides movable with respect to the first mentioned, a device which is carried by said other slides adapted for simultaneous engagement with the supporting member and with one of said first mentioned top member slides, such top member slide being provided with a plurality of means for such engagement positioned along the length of the slides at half filler width intervals.

18. In an extension table in combination with the supporting member and top members which are extensible relative thereto; means which connect the top members with each other and with the supporting member, comprising slides fast on the top members respectively, and other slides fast on the supporting member; a device adapted to be simultaneously engaged with the supporting member and with the slides on the top member respectively, said slides being provided with a plurality of means for such engagement positioned along the length of the slides at half filler width intervals, and means carried by the supporting member for supporting said device independently of the top members.

19. In an extension table comprising a supporting member and top members which are movable relatively to the supporting member for extension to admit fillers, in combination with such supporting members and top members, two sets of slides which connect them for extension, each set comprising slides fast on the supporting member and other slides fast on the opposite top members respectively; a rock shaft and two sets of pawls carried thereby for engaging respectively, the slides of the opposite top members, said slides having devices for engagement of the pawls therewith, said pawls and engaging devices being adapted for engagement in direction to retract the slides and resist their extension, and means carried by the supporting member for supporting said rock shaft independently of the top members.

20. In an extension table in combination with table top members and the slides with which they are connected for extension; adjacent slides having notches which are registered with each other at the several intervals of extension and devices for lodgment in the registered notches adapted for engagement with the ends of said notches for engaging the adjacent slides with each other.

21. In an extension table comprising a supporting member and top members movable relatively thereto for extension to admit fillers, in combination with such supporting member and top members, two sets of slides which connect them for extension, and fillers adapted to be interposed, each set comprising a slide movable with respect to the top member, and exterior and interior slides attached to the top members respectively, the exterior and interior slides being ratcheted, the step intervals between the ratchet shoulder being half the unit filler width, and means carried by said movable slides, coöperating with said ratchet shoulder for resisting extension.

In testimony whereof, I have hereunto set my hand at Chicago, Illinois, this 27th day of September 1909.

CHARLES S. BURTON.

Witnesses:
C. J. Christoffel,
M. G. Ady.

Copies of this patent may be obtained for five cents each, by addressing the "Commissioner of Patents, Washington, D. C."